US009965301B2

United States Patent
Morelli, Jr. et al.

(10) Patent No.: US 9,965,301 B2
(45) Date of Patent: May 8, 2018

(54) SYSTEMS AND METHODS FOR MANAGING EMULATION RESOURCES

(71) Applicant: Sphere 3D Inc., Mississauga (CA)

(72) Inventors: Giovanni Morelli, Jr., Toronto (CA); Brandon Cowen, Mississauga (CA); Marian Dan, Mississauga (CA); Hussain Damji, Mississauga (CA)

(73) Assignee: Sphere 3D Inc., Mississauga (CA)

( * ) Notice: Subject to any disclaimer, the term of this patent is extended or adjusted under 35 U.S.C. 154(b) by 1077 days.

(21) Appl. No.: 14/229,368

(22) Filed: Mar. 28, 2014

(65) Prior Publication Data
US 2014/0297249 A1   Oct. 2, 2014

Related U.S. Application Data

(60) Provisional application No. 61/806,054, filed on Mar. 28, 2013, provisional application No. 61/806,059, (Continued)

(51) Int. Cl.
*G06F 9/455* (2018.01)
*G06F 9/50* (2006.01)

(52) U.S. Cl.
CPC .......... *G06F 9/455* (2013.01); *G06F 9/45558* (2013.01); *G06F 9/5027* (2013.01); (Continued)

(58) Field of Classification Search
CPC .... G06F 9/455; G06F 9/45558; G06F 9/5027; G06F 2009/45583; G06F 2009/4557; G06F 2009/45579
(Continued)

(56) References Cited

U.S. PATENT DOCUMENTS

| | | |
|---|---|---|
| 5,341,477 A | 8/1994 | Pitkin et al. |
| 5,748,890 A | 5/1998 | Goldberg et al. |

(Continued)

FOREIGN PATENT DOCUMENTS

| | | |
|---|---|---|
| EP | 998705 | 10/1997 |
| JP | 200057091 | 2/2005 |

(Continued)

OTHER PUBLICATIONS

Response to Advisory Action dated Apr. 16, 2015, U.S. Appl. No. 13/742,585.

(Continued)

*Primary Examiner* — Saif A Alhija
(74) *Attorney, Agent, or Firm* — Bereskin & Parr LLP/S.E.N.C.R.L., s.r.l.

(57) ABSTRACT

A method and system for managing an emulation of a computer product. The method and system involve receiving emulation parameters associated with the emulation of the computer product, the emulation parameters defining one or more resources required to provide the emulation; identifying one or more capable emulator servers from a plurality of emulator servers based at least on the one or more resources; retrieving emulator server data for each capable emulator server; determining one or more criteria usable for selecting an emulator server from the one or more capable emulator servers to provide the emulation; and selecting the emulator server from the one or more capable emulator servers to provide the emulation, the emulator server being a capable emulator server from the one or more capable emulators associated with emulator server data satisfying at least some of the one or more criteria.

18 Claims, 9 Drawing Sheets

Related U.S. Application Data filed on Mar. 28, 2013, provisional application No. 61/806,048, filed on Mar. 28, 2013.

(52) U.S. Cl.
CPC ............... *G06F 2009/4557* (2013.01); *G06F 2009/45579* (2013.01); *G06F 2009/45583* (2013.01)

(58) Field of Classification Search
USPC .............................................. 703/27, 23, 24
See application file for complete search history.

(56) References Cited

U.S. PATENT DOCUMENTS

| | | | |
|---|---|---|---|
| 6,216,101 B1* | 4/2001 | Butts | G06F 9/54 370/466 |
| 6,389,379 B1 | 5/2002 | Lin et al. | |
| 6,750,885 B1 | 6/2004 | Finch et al. | |
| 7,007,093 B2 | 2/2006 | Spicer et al. | |
| 7,219,234 B1 | 5/2007 | Ashland et al. | |
| 7,278,005 B1 | 10/2007 | Wolf et al. | |
| 7,434,257 B2 | 10/2008 | Garg et al. | |
| 7,568,217 B1 | 7/2009 | Prasad et al. | |
| 7,580,826 B2 | 8/2009 | Vega et al. | |
| 7,779,091 B2 | 8/2010 | Wilkinson et al. | |
| 7,870,256 B2 | 1/2011 | Talwar et al. | |
| 8,028,040 B1 | 9/2011 | Hobbs et al. | |
| 8,141,075 B1 | 3/2012 | Chawla et al. | |
| 8,175,863 B1 | 5/2012 | Ostermeyer et al. | |
| 8,347,288 B1 | 1/2013 | Brandwine | |
| 8,453,145 B1 | 5/2013 | Naik | |
| 8,555,274 B1 | 10/2013 | Chawla et al. | |
| 8,572,613 B1 | 10/2013 | Brandwine | |
| 8,707,397 B1 | 4/2014 | Wilkinson et al. | |
| 9,665,700 B2 | 5/2017 | Morelli, Jr. | |
| 2005/0132220 A1 | 6/2005 | Chang et al. | |
| 2006/0190238 A1 | 8/2006 | Autor et al. | |
| 2007/0130305 A1 | 6/2007 | Piper et al. | |
| 2008/0235764 A1* | 9/2008 | Cohen | G06F 21/6281 726/1 |
| 2008/0263635 A1 | 10/2008 | Rubio et al. | |
| 2009/0007229 A1 | 1/2009 | Stokes | |
| 2010/0269046 A1 | 10/2010 | Pahlavan et al. | |
| 2010/0299436 A1 | 11/2010 | Khalid et al. | |
| 2011/0018883 A1 | 1/2011 | Sampath et al. | |
| 2011/0055602 A1 | 3/2011 | Kamay et al. | |
| 2011/0145574 A1 | 6/2011 | Ju et al. | |
| 2011/0153644 A1 | 6/2011 | Kosuru et al. | |
| 2011/0153716 A1 | 6/2011 | Malakapalli et al. | |
| 2011/0246904 A1 | 10/2011 | Pinto et al. | |
| 2011/0265009 A1 | 10/2011 | Eby et al. | |
| 2012/0089980 A1 | 4/2012 | Sharp et al. | |
| 2012/0110571 A1 | 5/2012 | Smith et al. | |
| 2012/0297455 A1 | 11/2012 | Novak et al. | |
| 2013/0055102 A1 | 2/2013 | Matthews et al. | |
| 2013/0060837 A1 | 3/2013 | Chakraborty et al. | |
| 2013/0076768 A1 | 3/2013 | Chakraborty et al. | |
| 2013/0104125 A1 | 4/2013 | Sarma et al. | |

FOREIGN PATENT DOCUMENTS

| | | |
|---|---|---|
| WO | 2008118464 | 10/2008 |
| WO | 2014153649 | 10/2014 |

OTHER PUBLICATIONS

Advisory Action dated Apr. 16, 2015, U.S. Appl. No. 13/742,585.
Response to Office Action dated Jan. 14, 2015, U.S. Appl. No. 13/742,585.
Office Action dated Jan. 14, 2015, U.S. Appl. No. 13/742,585.
Response to Office Action dated Jun. 23, 2014, U.S. Appl. No. 13/742,585.
Office Action dated Jun. 23, 2015, U.S. Appl. No. 13/742,585.
Office Action dated Mar. 10, 2015, U.S. Appl. No. 13/742,632.
Response to Office Action dated Mar. 10, 2015, U.S. Appl. No. 13/742,632.
Interview Summary dated May 29, 2015, U.S. Appl. No. 13/742,585.
Preliminary Amendment dated Jun. 10, 2015, U.S. Appl. No. 13/742,585.
How to redirect to a certain URL if a page returns an "access denied" message? Posted by DrupalCuckoo on Jul. 12, 2010 at 10:39am https://groups.drupal.org/node/50154.
Microsoft, "Remote Desktop Protocol", Retrieved from the Internet: URL: msdn.microsoft.com/en-ca/library/windows/desktop/aa383015(v=vs.85).aspx [retrieved on Apr. 8, 2013].
Microsoft, "Virtual Desktop Infrastructure", Retrieved from the Internet: URL: www.microsoft.com/en-us/server-cloud/windows-server/virtual-desktop-infrastructure.aspx [retrieved on Apr. 8, 2013].
Microsoft, "Remote Desktop Services in Windows Server 2008 R2", Retrieved from the Internet: URL: technet.microsoft.com/library/dd647502(WS.10).aspx [retrieved on Apr. 8, 2013].
Microsoft, "Microsoft Hyper-V Server 2012", Retrieved from the Internet: URL: www.microsoft.com/en-us/server-cloud/hyper-v-server/default.aspx [retrieved on Apr. 8, 2013].
Microsoft, "Virtualization Desktop Infrastructure, Windows Server 2012", Retrieved from the Internet: URL: download.microsoft.com/download/F/E/D/FED8C1A8-B146-4434-BE2E-A82CA9F26079/WS%202012%20White%20Paper_VDI.pdf [retrieved on Apr. 8, 2013].
Microsoft, "Why Hyper-V?", Retrieved from the Internet: URL: download.microsoft.com/download/5/7/8/578E035F-A1A8-4774-B404-317A7ABCF751/Competitive-Advantages-of-Hyper-V-Server-2012-over-VMware-vSphere-Hypervisor.pdf [retrieved on Apr. 8, 2013].
International Search Report and Written Opinion dated Jul. 11, 2014, International Application No. PCT/CA2014/000301.
Office Action for U.S. Appl. No. 13/741,884. dated Jan. 15, 2016.
Communication Pursuant to Article 94(3) EPC for European Patent Application No. 14776474 dated Mar. 28, 2017.
Extended European Search Report (EESR) for European Patent Application No. 14776474 dated Jul. 26, 2016.
International Preliminary report on Patentability (IPRP) for PCT/CA2014/000301 dated Oct. 8, 2015.
Non-Final Office Action for U.S. Appl. No. 14/229,381 dated Jul. 11, 2017.
Non-Final Office Action for U.S. Appl. No. 15/496,455 dated Jul. 6, 2017.
Non-Final Office Action for U.S. Appl. No. 14/229,497 dated Aug. 9, 2017.

* cited by examiner

SYSTEMS AND METHODS FOR MANAGING EMULATION RESOURCES

CROSS-REFERENCE TO RELATED APPLICATIONS

This application claims the benefit of U.S. Provisional Application No. 61/806,048, entitled "SYSTEMS AND METHODS FOR PROVIDING AN EMULATOR", filed Mar. 28, 2013; U.S. Provisional Application No. 61/806,054, entitled "SYSTEMS AND METHODS FOR MANAGING EMULATION RESOURCES", filed Mar. 28, 2013; and U.S. Provisional Application No. 61/806,059, entitled "SYSTEMS AND METHODS FOR ACCESSING REMOTE RESOURCES FOR EMULATION", filed Mar. 28, 2013. The entire contents of U.S. Provisional Application No. 61/806,048, U.S. Provisional Application No. 61/806,054, and U.S. Provisional Application No. 61/806,059 are hereby incorporated by reference.

FIELD

The described embodiments relate to systems and methods for managing emulation resources.

BACKGROUND

An emulator operates to imitate a computer product in an emulation session. The imitated computer product can be provided to a client device. The computer product can be a computer system, an operating environment, a software application, and/or one or more hardware and software components. The emulation system facilitates the emulation session by translating and processing instructions received from the client device into a format compatible with the emulated computer product.

An emulation session generally involves resources at both the client device and the emulation system. Efficient use of the resources can, therefore, conserve resources and improve operation of the emulation system.

SUMMARY

The various embodiments described herein generally relate to methods (and associated systems configured to implement the methods) for managing emulation resources.

In some embodiments, the method comprises receiving an emulation request from a client device, the emulation request comprises emulation parameters; creating an emulation session based on the emulation request; and identifying one or more emulation servers for providing the emulation session based on the emulation parameters.

In some further embodiments, the method may further comprise providing the emulation session using the identified one or more emulation servers.

Some embodiments relate to a method for managing an emulation of a computer product. In some embodiments, the method comprising: receiving emulation parameters associated with the emulation of the computer product, the emulation parameters defining one or more resources required to provide the emulation; identifying one or more capable emulator servers from a plurality of emulator servers based at least on the one or more resources, the one or more capable emulator servers being operable to provide the at least one or more resources; retrieving, from at least one database, emulator server data for each capable emulator server, the emulator server data comprising operational characteristics associated with that capable emulator server; determining, from the at least one database, one or more criteria usable for selecting an emulator server from the one or more capable emulator servers to provide the emulation; and selecting the emulator server from the one or more capable emulator servers to provide the emulation, the emulator server being a capable emulator server from the one or more capable emulators associated with emulator server data satisfying at least some of the one or more criteria.

In some embodiments, at least one capable emulator server in the one or more capable emulator servers is operable to provide at least one resource in the at least one or more resources by engaging one or more other emulator servers having the at least one resource.

In some embodiments, the one or more criteria comprises a server threshold, the server threshold indicating a maximum number of servers allowable for jointly providing the emulation; the operational characteristics comprising a server count for each emulator server, the server count indicating a number of other emulator servers required by that emulator server to provide the emulation; and selecting the emulator server from the one or more capable emulator servers to provide the emulation comprises, for each capable emulator server: comparing the server count with the server threshold; and indicating the server threshold is satisfied if the server count is less than the server threshold, otherwise, indicating the server threshold is not satisfied.

In some embodiments, selecting the emulator server from the one or more capable emulator servers to provide the emulation comprises: for each capable emulator server: storing, in the at least one database, a criterion count indicating a number of the one or more criteria satisfied by the emulator server data associated with that capable emulator server; determining whether each criterion is satisfied based on the emulator server data; for each satisfied criterion, incrementing the criterion count by one; and designating the capable emulator associated with a highest criterion count in the at least one database as the emulator server.

In some embodiments, the one or more criteria comprises a work load threshold, the work load threshold indicating a maximum usage of the emulator server for providing emulations; the operational characteristics comprising a current work load amount for each capable emulator server, the current work load amount indicating an existing usage of that capable emulator server; and selecting the emulator server from the one or more capable emulator servers to provide the emulation comprises, for each capable emulator server: comparing the current work load amount with the work load threshold; and indicating the work load threshold is satisfied if the current work load amount is less than the work load threshold, otherwise, indicating the work load threshold is not satisfied.

In some embodiments, each of the maximum usage and the existing usage is defined by at least one of a number of active emulation sessions being provided by a corresponding emulator server and an amount of memory used by the active emulation sessions.

In some embodiments, the one or more criteria comprises a geographic restriction, the geographic restriction defining a geographic boundary for the emulator server; the operational characteristics comprising a location of each emulator server; and selecting the emulator server from the one or more capable emulator servers to provide the emulation comprises, for each capable emulator server: comparing the geographic restriction with the location; and indicating the geographic restriction is satisfied if the location is within the geographic boundary, otherwise, indicating the geographic restriction is not satisfied.

In some embodiments, the emulation parameters are provided from a client device at a device location, the client device having a processor and a memory; and the geographic boundary comprises a proximity range with respect to the device location.

In some embodiments, the one or more criteria comprises a state condition, the state condition indicating a status required at the emulator server for providing emulations; the operational characteristics comprising an emulator state for each emulator server, the emulator state indicating an ability of that emulator server to provide any emulation; and selecting the emulator server from the one or more capable emulator servers to provide the emulation comprises, for each capable emulator server: comparing the emulator state with the state condition; and indicating the state condition is satisfied if the emulator state corresponds to the state condition, otherwise, indicating the state condition is not satisfied.

In some embodiments, the state condition is an available state and the emulator state is selected from the group consisting of the available state, an error state and an unavailable state.

In some embodiments, the one or more criteria comprises a component threshold, the component threshold indicating a maximum number of components usable for providing the at least one or more resources for the emulation; the operational characteristics comprising a component count for each emulator server, the component count indicating a number of components required by that emulator server to provide the emulation; and selecting the emulator server from the one or more capable emulator servers to provide the emulation comprises, for each capable emulator server: comparing the component count with the component threshold; and indicating the component threshold is satisfied if the component count is less than the component threshold, otherwise, indicating the component threshold is not satisfied.

In some embodiments, selecting the emulator server from the one or more capable emulator servers to provide the emulation comprises initiating the emulator server to provide the emulation of the computer product.

In some embodiments, initiating the emulator server to provide the emulation of the computer product comprises providing at least the emulation parameters to the emulator server.

In some embodiments, initiating the emulator server to provide the emulation of the computer product comprises: initiating a cache emulator server to concurrently provide the emulation of the computer product with the emulator server.

In some embodiments, receiving, from the emulator server, an error message indicating the emulator server is experiencing an operational problem; and in response to receiving the error message, switching to the emulation provided by the cache emulator server.

In some embodiments, the one or more resources comprises at least one of (i) a hardware component controllable by a server processor and (ii) a software component storable on a storage module in electronic communication with the emulator server.

In some embodiments, the one or more criteria is determined based on at least one of the emulator server data and the emulation parameters.

Some embodiments relate to a system for managing an emulation of a computer product. In some embodiments, the system comprising a processor configured to: receive emulation parameters associated with the emulation of the computer product, the emulation parameters defining at least one or more resources required to provide the emulation; identify one or more capable emulator servers from a plurality of emulator servers based at least on the one or more resources, the one or more capable emulator servers being operable to provide the at least one or more resources; retrieve, from at least one database in electronic communication with the processor, emulator server data for each capable emulator server, the emulator server data comprising operational characteristics associated with that capable emulator server; determine, from the at least one database, one or more criteria usable for selecting an emulator server from the one or more capable emulator servers to provide the emulation; and select the emulator server from the one or more capable emulator servers to provide the emulation, the emulator server being a capable emulator server from the one or more capable emulators associated with emulator server data satisfying at least some of the one or more criteria.

BRIEF DESCRIPTION OF DRAWINGS

Several embodiments of the present invention will now be described in detail with reference to the drawings, in which.

Figure 1:
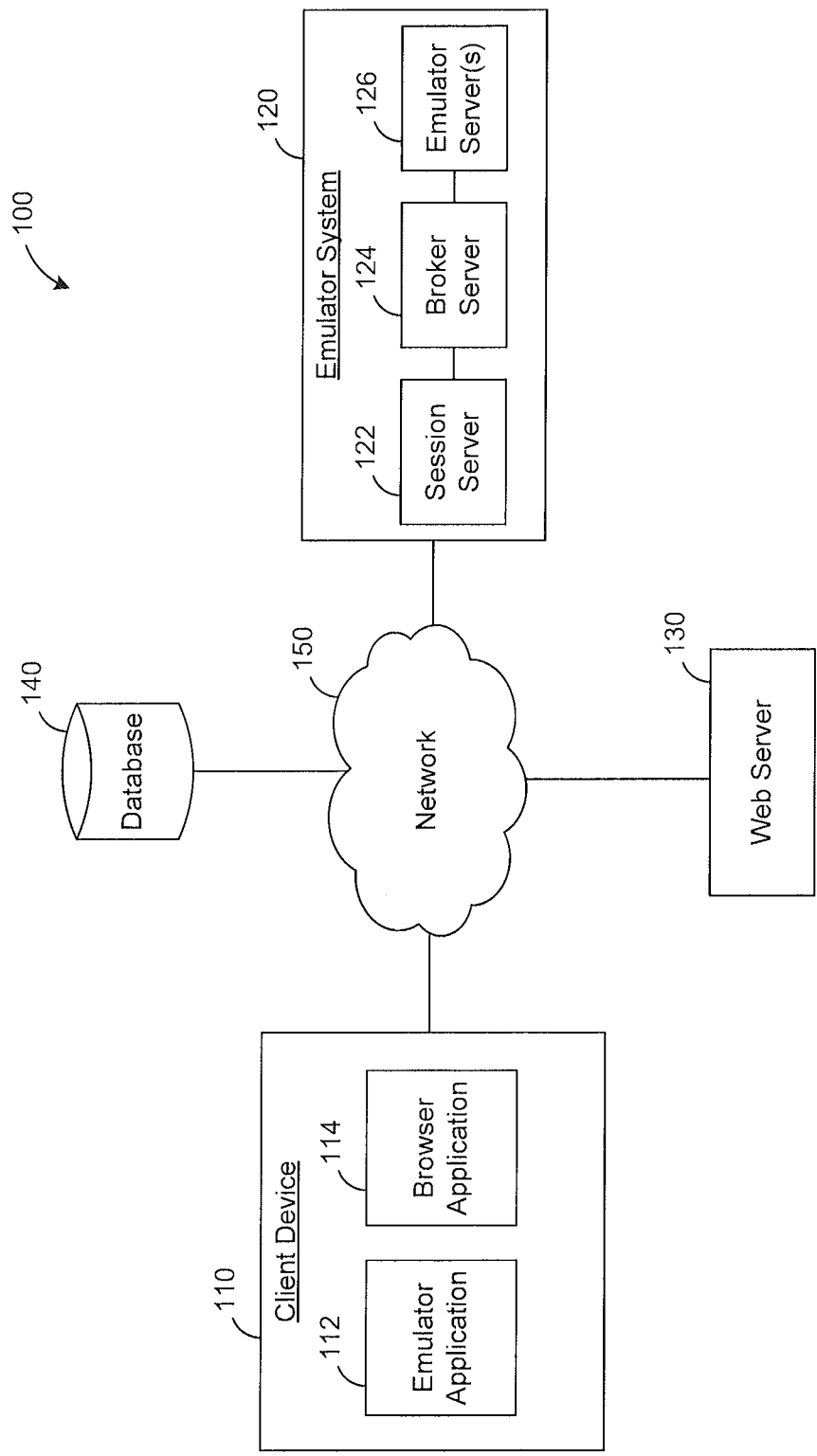
FIG. 1 is a block diagram illustrating an emulator system in communication with other components, in accordance with an example embodiment.

The drawings, described below, are provided for purposes of illustration, and not of limitation, of the aspects and features of various examples of embodiments described herein. The drawings are not intended to limit the scope of the teachings in any way. For simplicity and clarity of illustration, elements shown in the figures have not necessarily been drawn to scale. The dimensions of some of the elements may be exaggerated relative to other elements for clarity. It will be appreciated that for simplicity and clarity of illustration, where considered appropriate, reference numerals may be repeated among the figures to indicate corresponding or analogous elements or steps.

DETAILED DESCRIPTION OF EXEMPLARY EMBODIMENTS

The embodiments of the systems, processes and methods described herein may be implemented in hardware or software, or a combination of both. Alternatively, these embodiments may also be implemented in computer programs executed on programmable computers each comprising at least one processor (e.g., a microprocessor), a data storage system (including volatile and non-volatile memory and/or storage elements), at least one input device, and at least one output device. For example and without limitation, the programmable computers (referred to below as computing devices) may be a personal computer, laptop, personal data assistant, cellular telephone, smart-phone device, tablet computer, and/or wireless device. For any software components, program code is applied to input data to perform the functions described herein and generate output information. The output information is applied to one or more output devices, in known fashion.

Each software component or program may be implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, this description and the drawings are not to be considered as limiting the scope of the embodiments described herein in any way, but rather as merely describing the implementation of the various embodiments described herein.

The various embodiments described herein generally relate to a system (and related methods) for providing an emulator. The emulator can emulate computer products that can be provided on a variety of operating systems.

Reference is first made to FIG. 1, which illustrates a block diagram 100 of an emulator system 120 in communication with other components.

As shown in FIG. 1, the emulator system 120 may communicate with a client device 110, a web server 130 and/or a database 140 over a network 150. Similarly, each of the client device 110, the web server 130 and/or the database 140 may also communicate with each other over the network 150. It will be understood that, for ease of exposition, only one client device 110 is illustrated, but one or more client devices may be used.

The web server 130 can generally be used to host a website, or one or more webpages, that acts as a portal to the emulator system 120. The website may include, at least, a login page for receiving login credential from the user and a user interface for receiving user requests for initiating an emulation session. In some embodiments, the web server 130 may be provided as part of the emulator system 120.

The emulator system 120 may include one or more components for providing emulation of software and/or hardware components. The components may include a session server 122, a broker server 124 and an emulator server 126.

Each of the components may be associated with an identifier. That is, the session server 122 may be associated with a session server identifier, the broker server 124 may be associated with a broker server identifier and the emulator server 126 may be associated with an emulator server identifier.

Each of the session server 122, the broker server 124 and the emulator server 126 can include a processing component. For example, the session server 122 may include a session processor module. The broker server 124 may include a broker processor module, and the emulator server 126 may include an emulator processor module. In some embodiments, the session server 122 and the broker server 124 may be provided on the same computer server. It is also possible, in some embodiments, for the session processor module and the broker processor module to be provided individually or together as one processor component. It will be understood that, although one broker server 124 and one emulator server 126 are shown, one or more broker servers 124 and one or more emulator servers 126 may be provided.

The session server 122 can generally operate to create one or more sessions when a user request is received and to track each created session based on a session identifier. For example, the session server 122 may receive a request from the client device 110 for initiating an emulation session. The session server 122 can then create an emulation session corresponding to the received request and to assign a unique emulation session identifier to that emulation session. In some embodiments, the session server 122 may be a system that includes, at least, a database server integrated with a web application server. For example, the session server 122 may be implemented using an Alpha Five™ Application Server.

The broker server 124 can generally operate to determine which emulator server 126 provides any particular emulation. It will be understood that one or more broker servers 124 may be provided. The operations of the broker server 124 are described in further detail with reference to FIG. 5.

The emulator server 126 can generally operate to emulate the software and/or hardware based on the request received from the client device 110. The emulator server 126 may be a central emulator server or a node emulator server. Each of the central emulator server and the node emulator server is described below.

The client device 110 may generally be any computing device capable of network communication. The client device 110 can include a processing component and a memory component. For example and without limitation, the client device 110 may be a personal computer, laptop, personal data assistant, cellular telephone, smart-phone device, tablet computer, and/or wireless device. The client device 110 may include one or more software and/or hardware modules. For example, as illustrated in FIG. 1, the software modules may include an emulator application 112 and a browser application 114. The emulator application 112 will be described below in greater detail. The browser application 114 may be executed on the client device 110 for providing a browser with which a user may access the network 150.

The hardware modules provided on the client device 110 may include, without limitations, any known hardware components for operating the client device 110. For example, the hardware modules may include an interface module for receiving and/or transmitting data (e.g., a USB port, one or more peripheral ports, etc.), a processor module (e.g., a central processing unit), a storage module (e.g., RAM), a navigation module (e.g., a Global Positioning System), a multimedia module (e.g., a sound card, a video card, etc.), a communication module for providing communication with external components and/or devices (e.g., via radio-frequency, wireless, and/or Bluetooth™ communication), one or more user interface components (e.g., a touch screen, a keyboard, a display), and/or other modules for providing additional features (e.g., a Gyroscope, etc.).

It will be understood that other software and/or hardware components may be provided on the client device 110.

The database 140 is provided to store and/or to provide various data information associated with the client device 110, operation of the web server 130, and/or operation of the emulator system 120. The database 140 may be accessible over the network 150 by any of the client device 110, the web server 130 and the emulator system 120.

The network 150 may include a mobile network, the internet and/or a virtual emulator network. The virtual emulator network may include a virtual external bus, as will be described below.

In some embodiments, communications over the mobile network may be optimized for eliminating latency in data transmittal between the client device 110 and the emulator system 120. It will be understood that mobile networks typically operate on four different communication channels, namely a Machine-to-Machine (MTM) channel, a voice channel, a data channel, and a micro-burst channel. Currently, the voice channel receives the most traffic. A channel optimizing application may be installed on the client device 110 so that data may be spread across two or more of these channels within the mobile network. In this way, data transfer latency can be substantially reduced.

Figure 2:
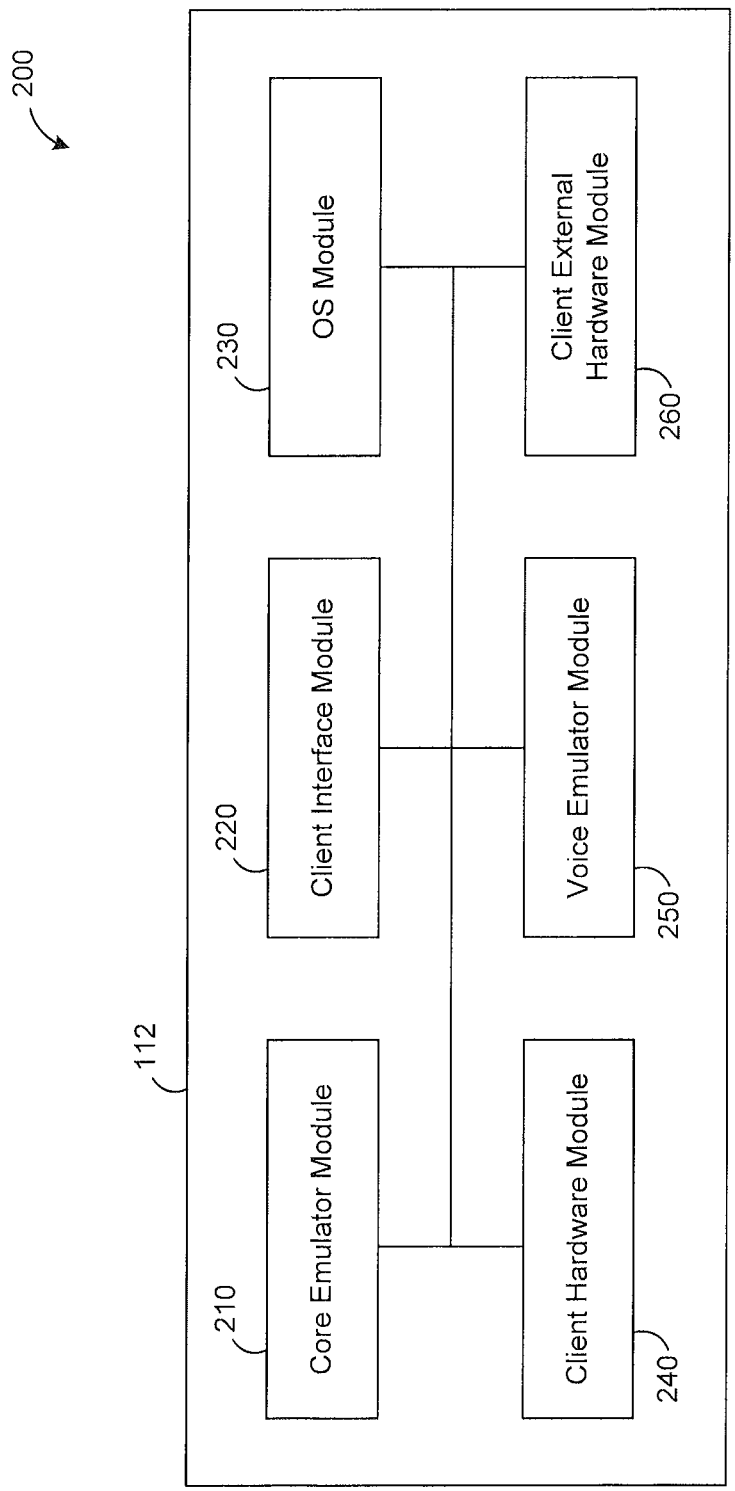
FIG. 2 is a block diagram illustrating an emulator application, in accordance with an example embodiment.

Reference is now made to FIG. 2, which illustrates a block diagram 200 of the emulator application 112 provided on the client device 110 in accordance with an example embodiment.

The emulator application 112 can enable compatibility between the client device 110 and the emulator system 120. As illustrated in FIG. 2, the emulator application 112 may include various modules that can be implemented in software and/or hardware. The various modules include a core emulator module 210, a client interface module 220, an operating system module 230, a client hardware module 240, a voice emulator module 250, and a client external hardware module 260.

The emulator application 112 may provide an automated authentication process for authenticating the client device 110. When the emulator application 112 is installed on the client device 110, the client hardware module 240 may select one or more hardware components on that client device 110 and record unique identifiers for the selected hardware components. The hardware component identifiers may be stored in the database 140. The hardware components may be selected randomly, or based on a predetermined order. After the selected hardware component identifiers are stored, the emulator system 120 may verify the client device 110 by comparing the stored hardware component identifiers with hardware components on that client device 110. If the client device 110 is verified, the client device 110 may be automatically logged into the emulator system 120 without requiring additional information from the user.

It will be understood that the automated authentication process may be integrated with existing systems for providing enhanced security to the login process. For example, the automated authentication process may be integrated into the systems provided by VMware™ and/or Citrix™.

The emulator application 112 may also enable the client device 110 to properly interface with any hardware components that may be provided at the emulator server 126. For example, if the client device 110 is a touch-screen device, the client interface module 220 can operate to translate any user input received via the touch screen display into a data format that is compatible with the emulator system 120.

The core emulator module 210 provides generic emulation functionalities to the client device 110. The core emulator module 210 can be built using a software development kit.

The client interface module 220 generally operates as an input/output interface between the client device 110 and the emulator system 120. For example, the client interface module 220 ensures that the client device 110 can properly send data to and receive data from the network 150, such as via the virtual external bus.

The operating system module 230 identifies the operating system currently used at the client device 110 and operates to resolve any compatibility problems between the operating system at the client device 110 and the emulator system 120.

The client hardware module 240 identifies hardware components available at the client device 110. The available hardware components may be stored in the database 140. As described above, the client hardware module 240 may also be used as part of the automated authentication process for randomly selecting one or more hardware components on the client device 110 and recording unique identifiers corresponding to the selected hardware components.

The voice emulator module 250 provides emulation of a telephone application.

The client external hardware module 260 enables external hardware components connected to the client device 110 to be used during an emulation provided at the emulator server 126.

The emulator system 120 may receive user requests for initiating one or more emulation sessions via a website hosted by the web server 130. The website may act as a portal to the emulator system 120. For example, the client device 110 may display the website using the browser application 114 and the web server 130 providing the displayed website may receive user data from the client device 110 via the website. The web server 130 may forward the received user data to the emulator system 120 for initiating corresponding emulation sessions.

However, in order to access the website, the web server 130 may first verify website login credentials. The website login credentials may correspond to the user and/or the client device 110.

After the web server 130 verifies the website login credentials for the user and/or the client device 110, the client device 110 gains access to the website and can proceed to initiate one or more emulation session on the emulator system 120. The session server 122 operates to receive requests from the client device 110 via the web server 130 for initiating one or more emulation sessions. These requests from the client device 110 may be referred to as emulation requests. Upon receipt of an emulation request, the session server 122 proceeds to implement the emulation request. In some embodiments, the session server 122 includes the web server 130, and therefore, also hosts the website.

Figure 3:
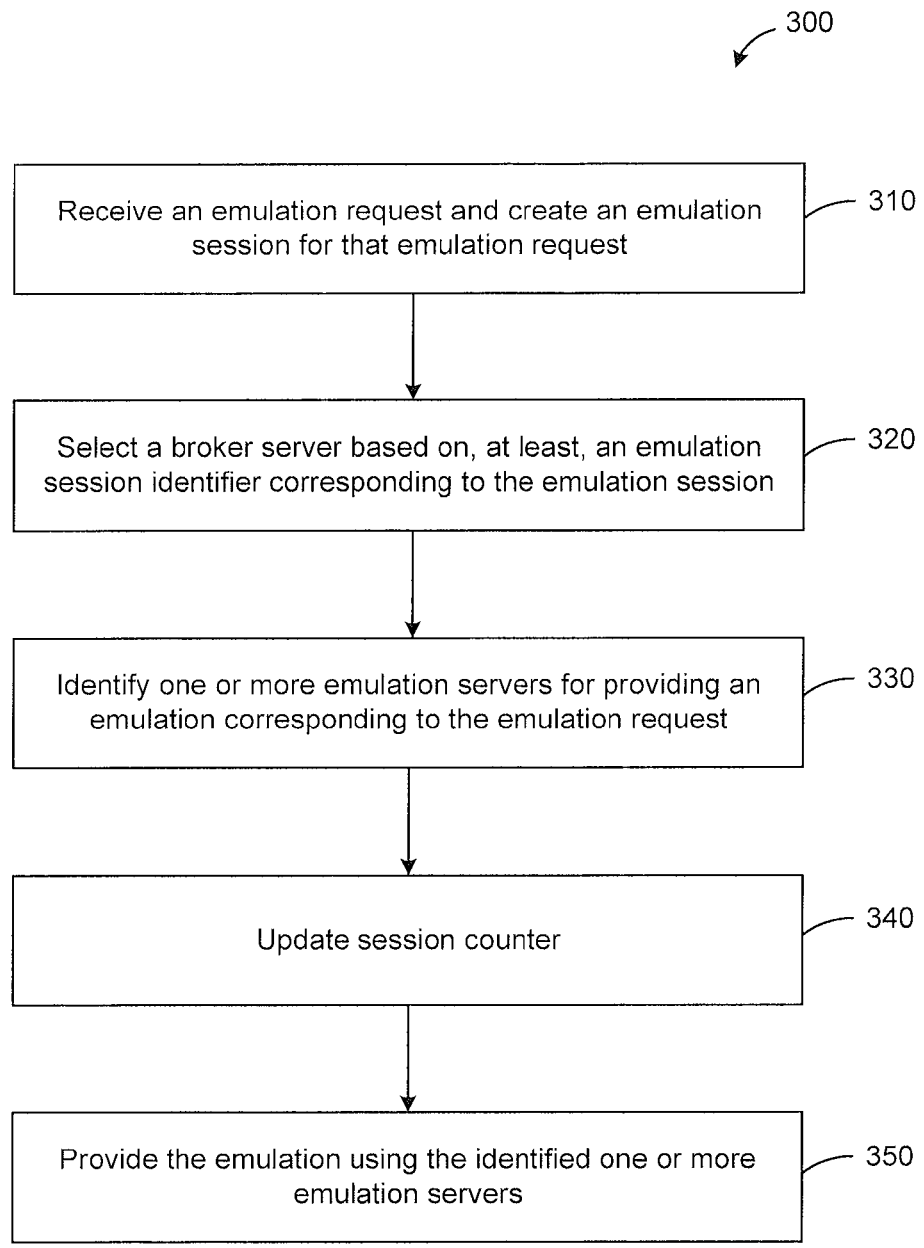
FIG. 3 is a flowchart illustrating a process for identifying emulator servers, in accordance with an example embodiment.

Reference is now made to FIG. 3, which is a flowchart illustrating an example process 300 for identifying emulator servers 126 for providing the emulation session corresponding to the emulation request.

As will be described below, the example process 300 generally includes collection of data and supply of the collected data between the client device 110 and the emulator system 120. This example process 300 may be referred to as an emulation protocol. The emulation protocol may also operate to collect data from other data sources, such as the database 140. The emulation protocol may also initiate one or more operations at the emulator system 120 and/or the client device 110.

At 310, the session server 122 receives the emulation request from the client device 110. The emulation request may include user data and/or client device data. The user data may be used for identifying and perhaps authenticating the user and/or the client device 110. Similarly, the client device data may also be used for identifying and perhaps authenticating the client device 110. The emulation request may also include emulation data that indicates aspects of the emulation being requested by the user. The emulation data may define at least one of a computer product to be emulated and one or more properties of the emulation.

At 320, after the session server 122 receives the emulation request, the session server 122 operates to create an emulation session for that emulation request. The session server 122 may create the emulation session based on, at least, the emulation data.

When the emulation session is created, the session server 122 can also create an emulation session identifier for that emulation session. The session server 122 can associate the emulation session identifier with that emulation session. The emulation session identifier may be unique to the emulation session being provided for the client device 110. The emulation session identifier may be stored in the database 140, or may instead be stored in a database at the session server 122. The database at the session server 122 may be referred to as a session server database. The session server 122 further operates to verify the user and/or the client device 110 based on data stored in the database 140 corresponding to the user and/or data stored in the database 140 corresponding to the client device 110.

In some embodiments, prior to creating the emulation session, the session server 122 may authenticate the client device 110 by comparing at least one of the user data and the client device data provided in the emulation request with the respective current user data stored in association with the user in the database 140 and the respective client device data stored in association with the database 140.

In response to a successful authentication of the client device 110, the session server 122 can create the emulation session. However, when the authentication is unsuccessful, the session server 122 may not create the emulation session, and instead may provide an error message to the client device 110 indicating a failed authentication.

Based on the received emulation request and corresponding emulation data, the session server 122 can determine the emulation being requested by the user. The session server 122 can then determine one or more resources required for providing the requested emulation. The required resources can include one or more hardware, firmware and/or software components that are required for conducting the requested emulation. In some embodiments, the database 140, or the session server database, may include data indicating the hardware, firmware and/or software components required for implementing different emulations and therefore, the session server 122 may determine the required hardware, firmware and/or software components for the requested emulation from the database 140, or the session server database. The session server 122 then operates to associate, or link, the required hardware, firmware, and/or software components with the emulation session identifier. For example, the session server 122 may associate, or link, identifiers corresponding to the required hardware components with the emulation session identifier by storing the required hardware component identifiers in association with emulation session identifier in the session server database.

At 320, the session server 122 selects a broker server 124 from one or more broker servers 124.

The session server 122 may select the broker sever 124 based on, at least, the emulation session identifier for the emulation session. In some embodiments, the session server 122 may select the broker server 124 based on the resources, such as hardware, firmware and/or software components, that are required for conducting the emulation session. The session server 122 may retrieve an address for the selected broker server 124 from the database 140 or the session server database. The address for the selected broker server 124 may be an internet protocol (IP) address.

At 330, the selected broker server 124 operates to identify one or more emulator servers 126 for providing the emulation session corresponding to the emulation request.

In some embodiments, the selected broker server 124 can be associated with a set of capable emulator servers, of a plurality of emulator servers 126. The set of capable emulator servers include one or more emulator servers 126 that can operate to provide the one or more resources required to provide the emulation.

The one or more emulator servers 126 selected by the broker server 124 may be identified from the set of capable emulator servers with which the selected broker server 124 is associated.

Operation of the broker server 124 is described below with reference to FIG. 5. Generally, the broker server 124 can identify the one or more emulator servers based on, for example, the one or more resources required to provide the emulation. As described below, the broker server 124 may identify the one or more emulator servers 126 by applying a manual selection process and/or a dynamic selection process. For example, the broker server 124 may select emulator server(s) based on a predefined order that may be provided in the database 140. In another example, the broker server 124 may select emulator server(s) based on a variety of factors and/or emulator server characteristics, such as geographical location, operational capabilities and/or parameters, availability, status, current load, efficiency, user data, client device data and other similar factors.

After identifying the one or more emulator servers 126, the broker server 124 may link identifiers corresponding to the emulator servers 126 with the emulation session identifier. For example, the broker server 124 may operate to store the emulator server identifiers in the database 140 in association with the emulation session identifier. In some embodiments, the broker server 124 may provide the emulator server identifiers to the session server 122 for storage in the session server database.

At 340, the session server 122 may update a session count. The session count generally indicates a number of active emulation sessions being provided by the emulator system 120. The session count may be stored in the database 140 or the session server database.

In some embodiments, the selected broker server 124 may use, at least, the session count to identify, at 330, the one or more emulator servers 126 for providing the emulation session.

For example, the database 140 or the session server database may include an emulator session count for each emulator server 126. The emulator session count can define a number of emulation sessions currently being provided at that emulator server 126. To identify which emulator server 126 to select for providing the emulation, the broker server 124 can use the session count for each emulator server 126 to determine which emulator servers 126 have an emulator session count that exceeds an emulator session count threshold stored at the database 140 or the session server database, for example. The emulator session count threshold can define a maximum number of emulation sessions concurrently providable by an emulator server 126.

In response to determining that the emulator session count of an emulator server 126 exceeds the emulator session count threshold, the broker server 124 may associate that emulator server 126 with an available status. Otherwise, the broker server 124 may associate that emulator server 126 with an unavailable status. The broker server 124 may then choose an emulator server 126 to provide the emulation from one or more emulator servers 126 associated with an available status.

In some embodiments, the session count may define a number of emulation sessions created by the session server 122.

In some embodiments, a session count may be provided for each broker server 124 so that each session count defines a number of active emulation sessions being managed by each broker server 124.

In some embodiments, the session server 122 may use session count data stored in database 140 or the session server database to select (for example, at 320) the broker server 124. For example, the session server 122 may determine whether the broker session count for each broker server 124 exceeds a broker session count threshold available in the database 140 or the session server database. The broker session count threshold may define a maximum number of emulation sessions concurrently providable by a broker server 124.

In response to determining that a broker session count of a broker server 124 exceeds the broker count threshold, the session server 122 may associate that broker server 124 with an available status. Otherwise, the session server 122 may associate that broker server 124 with an unavailable status. The session server 122 may then choose the broker server 124 from one or more broker servers 124 associated with the available status.

At 350, the identified one or more emulator servers 126 operate to provide the emulation session corresponding to the emulation request.

In some embodiments, after identifying the emulator servers 126 required for providing the emulation, the broker server 124 may access the database 140 or the session server database to define session data for the emulation session based on the emulation session identifier. The information to be provided as part of the session data may already be linked to the relevant emulation session identifier or may not yet be linked. For example, defining session data for the emulation session may include linking stored data, such as emulation parameters and identifiers, for use in initiating, providing and/or managing the emulation.

In some embodiments, the session data can include at least one of the resource identifiers for identifying the resources required to provide the emulation, the emulator server identifiers for identifying the selected emulator servers 126 for providing the emulation and the emulation data defining, for example, the computer product to be emulated and one or more properties of the emulation.

Once the session data is defined, the broker server 124 can proceed, based on the session data, to initiate the operation of the identified emulator servers 126 to provide the requested emulation.

The operation of the identified emulator servers 126 is described, below, with reference to FIGS. 6A, 6B, 7 and 8.

Figure 4:
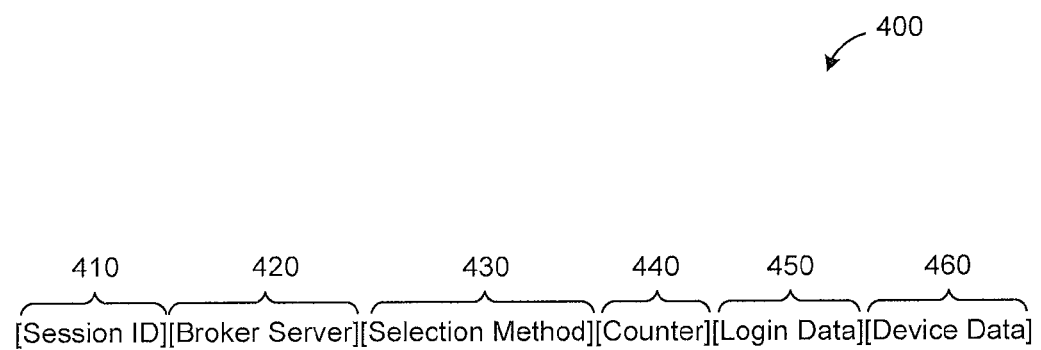
FIG. 4 illustrates an example layer format for emulation data, in accordance with an example embodiment.

In some embodiments, the data collected during the process 300 may be stored in accordance with a layer format. FIG. 4 illustrates an example layer format 400. A first layer 410 may include the emulation session identifier, a second layer 420 may include an address for the broker server 124, a third layer 430 may include an identifier of a method for selecting emulator servers for providing the emulation, a fourth layer 440 may include the session count, a fifth layer 450 may include a secondary login information, and a sixth layer 460 may include data identifying the emulator servers providing the emulation. The layer format may be stored in the database 140 or the session server database.

Figure 5:
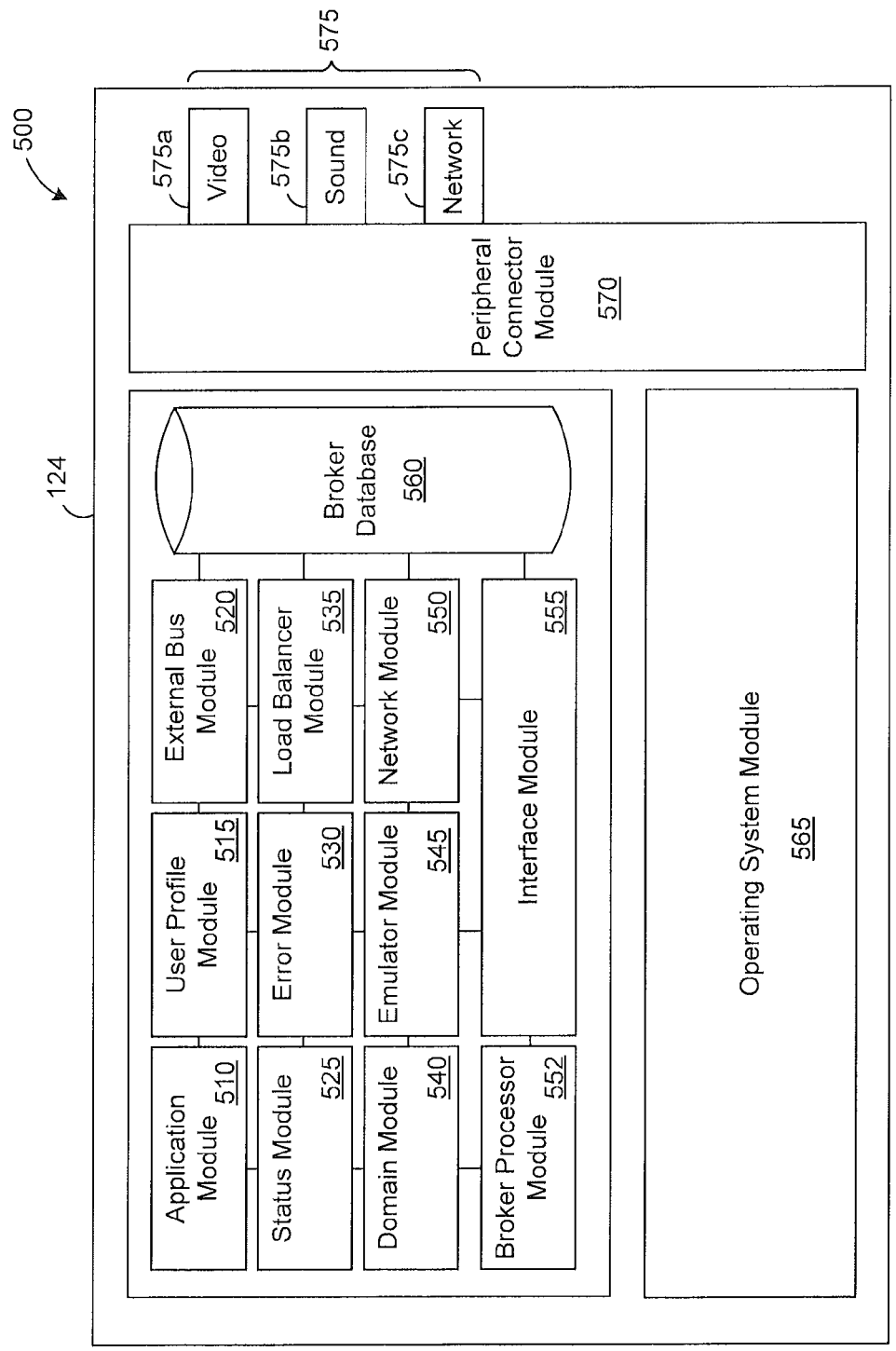
FIG. 5 is a block diagram of a broker server, in accordance with an example embodiment.

Reference is now made to FIG. 5, which illustrates a block diagram 500 of an example broker server 124.

The broker server 124 may include various modules for managing and/or initiating the emulation sessions. The broker server 124 may include an application module 510, a user profile module 515, an external bus module 520, a status module 525, an error module 530, a load balancer module 535, a domain module 540, an emulator module 545, a network module 550, an interface module 555, a broker processor module 552 and an operating system module 565. The broker server 124 may further include a broker database 560 and a peripheral connector module 470. It will be understood that each of these various modules may be provided as one or more software modules and/or hardware modules. It will be understood that, for ease of exposition, only a limited number of modules is illustrated in this embodiment and that fewer or more modules may be provided. It will be further understood that some of the described modules may be combined together.

As briefly described, the broker server 124 can operate to identify emulator servers 126 for providing the emulation corresponding to the emulation request received from the client device 110. The broker processor module 552 may, therefore, implement the manual selection process and/or the dynamic selection process for identifying the emulator servers 126.

When the broker processor module 552 selects emulator servers 126 based on the manual selection process, the broker server 124 operates to select the emulator servers 126 based on one or more predefined considerations, such as one or more criteria. The predefined considerations may include operational characteristics of each emulator server 126 and/or other operational requirements for the emulator system 120. For example, the operational characteristics may include a maximum operational threshold that indicates when a particular emulator server 126 is operating at a maximum capacity, and other factors. The operational requirements may indicate that, for each emulation session, a minimum or maximum number of emulator servers 126 is to be used, certain geographical requirements for the emulator servers 126, types of emulator servers 126, and/or other factors. The predefined considerations may be stored in a database, such as the database 140, the session server database and/or the broker database 560.

When the broker processor module 552 selects emulator servers 126 based on the dynamic selection process, the broker server 124 operates to select the emulator servers 126 by considering and balancing various operational characteristics associated with the emulator servers 126 and/or emulator system 120. The broker server 124 may consider the operational characteristics in view of one or more related considerations or criteria.

For example, based on the received emulation request, the broker server 124 may determine the minimum hardware and/or firmware requirements for providing the emulation request, the types of hardware needed for providing the emulation request, availability or capacity of emulator servers 126, and any applicable latency factors (e.g., geography of each emulator server 126, existing usage of each emulator server 126, etc.). The minimum hardware and/or firmware requirements may be referred to as a task list.

The criteria and operational characteristics may be stored in a database, such as the database 140, the session server database and/or the broker database 560. In some embodiments, the operational characteristics may be provided by any one or more of the modules provided in the broker server 124, such as, without limitation, the status module 525, the error module 530, the load balancer module 535, and/or the emulator module 545.

In some embodiments, the broker processor module 552 may select emulator servers 126 using a hybrid process involving aspects of the manual selection process and the dynamic selection process.

The peripheral connector module 570 enables external hardware devices to be connected to the broker processor module 552. By providing the peripheral connector module 570, the broker server 124 can perform additional functionalities.

In one aspect, the broker server 124 may use the external hardware devices to receive data from, for example, the session server 122, the emulator server 126 or the database 140, for determining and managing available emulation resources. As illustrated in FIG. 5, the peripheral connector module 570 may include connections 575 to a variety of external hardware devices, modules and/or components, such as a connection 575a to a video component (video connection), a connection 575b to a sound component (sound connection) and a connection 575c to a network module (network connection). In some embodiments, the peripheral connector module 570 may include a peripheral component interconnect (PCI).

The application module 510 manages the software applications that are provided on the emulator servers 126. The application module 510 may operate to store and/or retrieve information associated with each software application available on the emulator servers 126 from the broker database 560. For example, when a software application is installed onto an emulator server 126, the application module 510 receives an indication that the installed software application is available on that emulator server 126. The application module 510 can update the information stored for that emulator server 126.

The user profile module 515 manages, for each user, user preferences when conducting emulations and possibly other user information. The user may be an administrator user who can access the broker server 124 directly or an emulation user who can access the broker server 124 via the session server 122, for example.

The external bus module 520 manages communications with the external emulator bus. The external bus module 520 may communicate with the external emulator bus via the network module 550 and/or the interface module 555. In some embodiments, the external bus module 520 may operate to manage the transmission of data between the broker server 124 and the external emulator bus.

The status module 525 may determine an operational state of each emulator server 126. The status module 525 may operate to update the operational state of an emulator server 126 after the emulator module 545 initiates operation of that emulator server 126 for providing the emulation. In some embodiments, the status module 525 may periodically request, from each emulator server, an indication of its operational state.

The error module 530 may operate to receive and/or detect operational problems at any of the emulator servers 126. The error module 530 may receive indications of failures at the emulator servers 126 by detecting a status of each active emulator server 126. The error module 530 may operate to detect the status at regular intervals, continuously or upon receiving an indication of potential errors.

The error module 530 may receive failure indications, such as error messages, via the interface module 555 or the external bus module 520. When the error module 530 receives an indication of an operational problem at an emulator server 126, the error module 530 can operate to resolve that operational problem in various manners. The emulator server 126 experiencing operational problems may be referred to as a failed emulator server.

In some embodiments, the error module 530 may identify a replacement emulator server 126 for the failed emulator server.

In some embodiments, the error module 530 may replace the failed emulator server with a cache emulator server. The cache emulator server is used for capturing and storing of cache data while an emulator server is currently operating. The cache data generally corresponds to operations of the emulator server. In some embodiments, the cache emulator server may be initiated to concurrently provide the emulation with the emulator server. It will be understood that the storage of the cache data may be delayed due to various latency factors and the cache data may not completely reflect operation of the emulator server. When the emulator server fails, the error module 530 may receive an error message indicating that the emulator server is experiencing an operational problem. In response to receiving the error message, the error module 530 may replace the failed emulator server with the corresponding cache emulator server to switch to the emulation provided by the cache emulator server, in order to substantially continue the emulation with minimal delay.

The load balancer module 535 may determine an existing load at each of the emulator servers 126 and/or to balance the load between the emulator servers 126 by directing any new emulation sessions to emulator servers operating at a lower capacity. The load, for each emulator server, may correspond to a number of currently active emulation sessions and/or a total amount of memory currently used by active emulation session.

The load balancer module 535 may provide load information to the broker processor module 552 for use in the manual and/or dynamic selection processes. For example, the broker processor module 552 may select emulator servers for providing the emulation based on a work load amount at each emulator server. Therefore, based on the received load information, the broker processor module 552 can then select emulator servers 126 having a lowest load.

The domain module 540 can maintain a collection of security principals associated with the operating system module 565. For example, the domain module 540 may be a Windows™ domain when the operating system module 565 includes a Windows product or technology, such as Windows Server 2008.

The emulator module 545 may initiate the emulation session on the selected emulator server 126. After the broker processor module 552 identifies the emulator servers 126 for providing the emulation, the broker processor module 552 may operate with the emulator module 545 for initiating the emulation at the identified emulator server 126. For example, the emulator module 545 may operate to provide the emulation request and parameters of the emulation corresponding to the emulation request to the selected emulator server 126. The parameters of the emulation may also include the list of hardware, firmware and/or software required for providing the emulation. As described above, the list of required hardware, firmware and/or software may be associated with the emulation session identifier in the database 140 or the session server database. Accordingly, the emulator module 545 may operate to retrieve the list of required hardware and/or firmware, and provide the list to the selected emulator servers 126.

In some embodiments, the emulator module 545 may also initiate operation of the cache emulator server in parallel with the selected emulator server 126.

The network module 550 can operate to manage communications with the network 150. For example, the network module 550 may manage data received and/or transmitted via the network connection 575c provided on the peripheral connector module. The network module 550 may receive data from the network 150 via the interface module 555.

The interface module 555 can operate to send and/or receive data from external components. For example, the interface module 555 may receive and/or send data to external components via the peripheral connector module 570. The interface module 555 may also operate with one or more modules in the broker server 124 for retrieving data from external components. The external components may include the database 140 and the session server database.

The broker database 560 may store data corresponding to the emulator servers 126 and/or factors or criteria used for selecting emulator servers 126 for providing the emulation. For example, the broker database 560 may include, for each emulator server 126, a list of applications and/or hardware components that are available, physical location, operational characteristics (e.g., operational state from the status module 525, load information from the load balancer module 535, etc.), and other information related to emulator servers 126. The broker database 560 may further store the operational characteristics that are used in the manual and/or dynamic selection processes.

The operating system module 565 provides an operating system upon which the broker server 124 operates. The operation system may be a known operating system, such as a version of Windows Server 2008.

The operation of the broker server 124 in managing various aspects of an emulation session will now be described.

After the emulator system 120 receives an emulation request, the broker server 124 may be provided with emulation parameters associated with the emulation request. The emulation parameters may be provided from the session server 122 or the client device 110, or may be retrieved by the broker server 124 from database 140, the session server database or the broker database 560.

The emulation parameters can define aspects or properties of the emulation, including one or more resources required to provide the emulation. The emulation parameters may be derived from the data stored in the database 140, the session server database or the broker database 560.

Based on the emulation parameters, the broker server 124 may identify one or more capable emulator servers from a plurality of emulator servers 126. As noted, the capable emulator servers are operable to provide the one or more resources. In some embodiments, one or more of the capable emulator servers may be operable to provide the resources required to provide the emulation by engaging one or more other emulator servers 126 that can provide the required resources or have the required resources.

The broker server 124 may then retrieve emulator server data for each capable emulator server. The emulator server data may be retrieved from the database 140, the session server database or the broker database 560, and may define operational characteristics associated with a capable emulator server.

The broker server 124 may also determine one or more criteria that can be used for selecting an emulator server 126 to provide the emulation. The one or more criteria may be determined based on the data stored in the database 140, the session server database or the broker database 560. In some embodiments, the one or more criteria may be determined based on the emulator server data and/or the emulation parameters.

Based on the criteria, the broker server 124 can then select the emulator server 126 that is to provide the emulation from the identified capable emulator servers. For example, the broker server 124 can select the emulator server 126 to provide the emulation by determining which of the capable emulator servers is associated with emulator server data that satisfies at least some of the one or more criteria.

In some embodiments, the broker server 124 may select, as the emulator server 126 to provide the emulation, a capable emulator server that satisfies the highest number of the one or more criteria.

For example, a criterion count for each capable emulator server may be stored in the database 140, the session server database or the broker database 560. The criterion count for a capable emulator server may indicate a number of the one or more criteria satisfied by the emulator server data associated with that capable emulator server. The broker server 124 may determine for each capable emulator server whether each criterion is satisfied based on the emulator server data associated with that capable emulator server. For each criterion satisfied by a capable emulator server, the broker server 124 may increment the criterion count for that capable emulator server by one. The broker server 124 may then designate the capable emulator server associated with a highest criterion count as the emulator server 126 to provide the emulation.

In some embodiments, the one or more criteria may include a server threshold indicating a maximum number of servers allowable for jointly providing the emulation. The operational characteristics for each capable emulator server can include a server count that indicates a number of other emulator servers 126 required by that capable emulator server to provide the emulation. The broker server 124 can compare the server count for each capable emulator server with the server threshold. If the server count for a capable emulator server is less than the server threshold, then the broker server 124 can indicate that the capable emulator server satisfies the server threshold criterion. However, if the server count for a capable emulator server is not less than the server threshold, the broker server 124 can indicate that the capable emulator server does not satisfy the server threshold criterion.

In some embodiments, the one or more criteria may include a work load threshold indicating a maximum usage of the emulator server 126 for providing emulations. The operational characteristics for each capable emulator server may include a current work load amount that indicates an existing usage of that capable emulator server. The maximum usage and the existing usage may be defined by, for example, a number of active emulation sessions being provided by a corresponding emulator server 126 and/or an amount of memory used by the active emulation sessions. The broker server 124 can compare the current work load amount for each capable emulator server with the work load threshold. If the current work load amount for a capable emulator server is less than the work load threshold, then the broker server 124 can indicate that the capable emulator server satisfies the work load threshold criterion. However, if the current work load amount for a capable emulator server is not less than the work load threshold, then the broker server 124 can indicate that the capable emulator server does not satisfy the work load threshold criterion.

In some embodiments, the one or more criteria may include a geographic restriction defining a geographic boundary of the emulator server 126 that is to provide the emulation. The operational characteristics for each capable emulator server can include a location of that capable emulator server. The broker server 124 can compare the location of each capable emulator server with the geographic restriction. If the location of a capable emulator server is within the geographic boundary, then the broker server 124 can indicate that the capable emulator server satisfies the geographic restriction criterion. However, if the location of a capable emulator server is not within the geographic boundary, then the broker server 124 can indicate that the capable emulator server does not satisfy the geographic restriction criterion.

The geographic boundary may include, for example, a proximity range with respect to a device location from which a client device 110 provided the emulation parameters corresponding to the emulation request.

In some embodiments, the one or more criteria may include a state condition indicating a status required at the emulator server to provide the emulation. The operational characteristic for each capable emulator server can include an emulator state indicating an ability of that capable emulator server to provide any emulation.

The state condition may be, for example, an available state, and the emulator state may be one of the available state, an error state, or an unavailable state.

The broker server 124 can compare the emulator state for each capable emulator server with the state condition. If the emulator state for a capable emulator server corresponds to the state condition, then the broker server 124 can indicate that the capable emulator server satisfies the state condition criterion. However, if the emulator state for a capable emulator server does not correspond to the state condition, then the broker server 124 can indicate that the capable emulator server does not satisfy the state condition criterion.

In some embodiments, the one or more criteria may include a component threshold indicating a maximum number of components usable for providing the one or more resources required for the emulation. The operational characteristics for each capable emulator server may include a component count that indicates a number of components required by that capable emulator server to provide the emulation.

The broker server 124 can compare the component count for each capable emulator server with the component threshold. If the component count for a capable emulator server is less than the component threshold, then the broker server 124 can indicate that the capable emulator server satisfies the component threshold criterion. However, if the component count for a capable emulator server is not less than the component threshold, then the broker server 124 can indicate that the capable emulator server does not satisfy the component threshold criterion.

It will be appreciated that the broker server 124 may store data indicating whether a capable emulator server satisfies a particular criterion in the database 140, the session server database and/or the broker database 560.

Figure 6A:
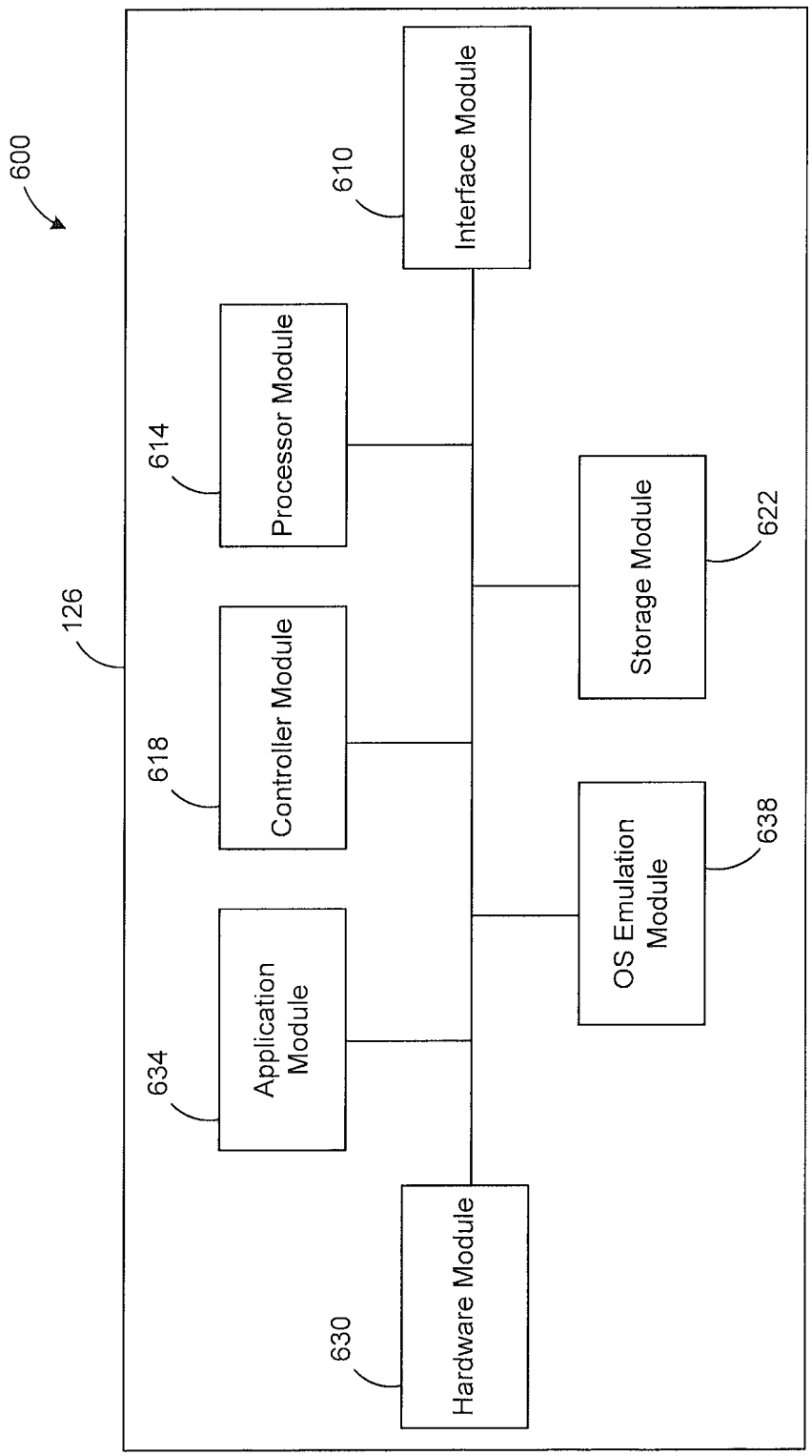
FIG. 6A is a block diagram of an emulator server, in accordance with an example embodiment.

Reference is now made to FIG. 6A, which illustrates a block diagram 600 of an example embodiment of an emulator server 126.

As described above, the emulator server 126 provides one or more emulation sessions based on emulation requests received from the client device 110. As illustrated in FIG. 6A, the emulator server 126 may include an interface module 610, a processor module 614, a controller module 618, a storage module 622, a hardware module 630, an application module 634, and an operating system (OS) emulation module 638. Each of these modules may be in communication with each other.

The storage module 622 may be associated with a predefined memory size.

After the broker server 124 selects at least one emulator server 126 for providing the emulation corresponding to the received emulation request, the broker server 124 provides the parameters, or properties, of the emulation to the emulator server 126. The emulation parameters may be received into the emulator server 126 via the interface module 610 and analyzed by the processor module 614.

The emulation properties may generally indicate aspects of the emulation.

The processor module 614 may parse the received emulation parameters (emulation properties) to determine resources (or components) required for providing the emulation. The required resources or components may include hardware, software and/or firmware components. The required software components include, at least, an operating system (OS).

The hardware component can generally be controllable by a server processor. The software component can generally be storable on the storage module 622.

After determining the required components, the processor module 614 may further determine an amount of memory required for providing the emulation and partition an amount of memory within the storage module 622. The partitioned amount of memory can be at least the amount of memory required for the emulation and also less than the predefined memory size.

In some embodiments, the emulation properties can include an emulation memory size that can indicate a minimum amount of memory that is required for emulating the computer product of interest.

The partitioned memory within the storage module 622 will be used for initializing and conducting the emulation. An example partitioned memory used for conducting the emulation is described below with reference to FIG. 6B.

It will be understood that the processor module 614 may partition an area within the storage module 622 as virtual random access memory (VRAM). The partitioned VRAM may be shared between one or more emulations.

In some embodiments, the processor module 614 may provide a memory address corresponding to the partitioned memory to the emulator module 545 in the broker server 124. The emulator module 545 may proceed to associate the received memory address with the corresponding emulation session identifier within the database 140, the session server database and/or the broker database 560.

Figure 7:
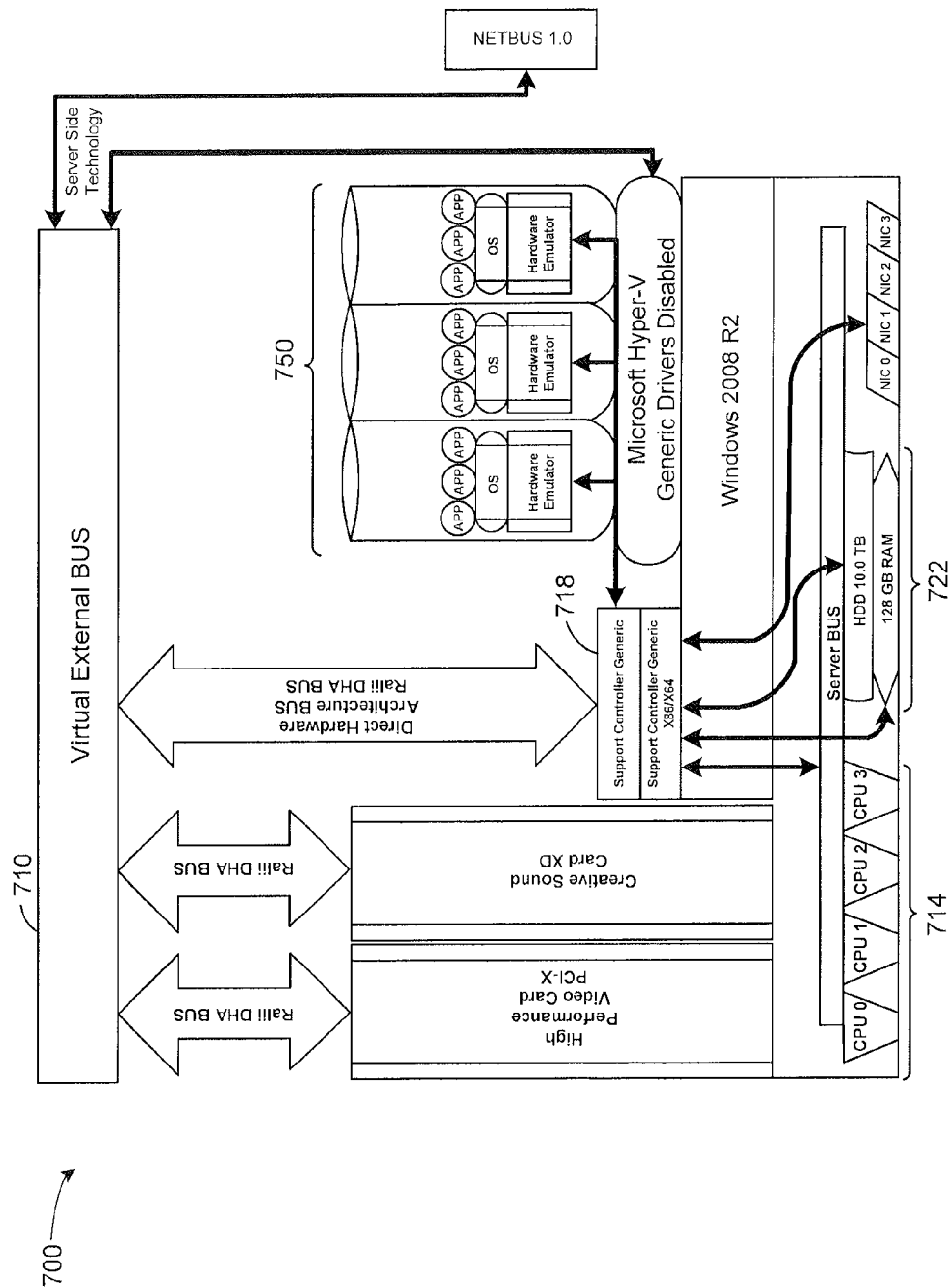
FIG. 7 is a block diagram of a node emulator server, in accordance with an example embodiment.
Figure 8:
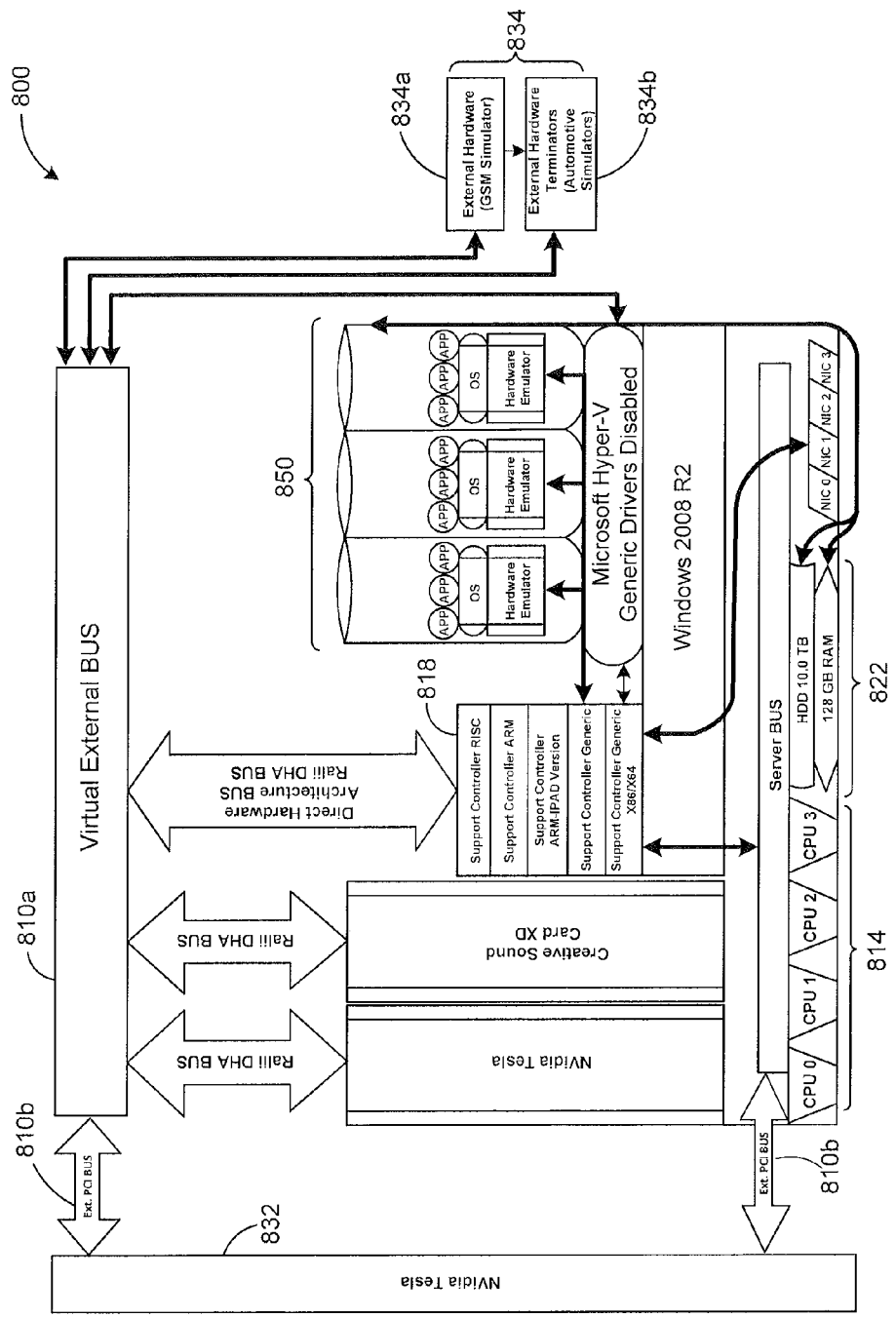
FIG. 8 is a block diagram of a central emulator server, in accordance with an example embodiment.

Generally, it is important to maintain a clear record of each emulation session. As generally shown in FIGS. 7 and 8, each emulator server 126 may simultaneously and independently provide emulation sessions for multiple users. As described above, each emulation session corresponds to an emulation session identifier and thus, each emulation session is associated with the client device 110 from which the emulation request was sent. Accordingly, each emulator server may provide emulation sessions for multiple users without interference between each emulation session. Although the emulation sessions are provided independently of each other, it may be possible for certain resources, such as certain emulations of hardware components, operating systems, and/or applications, to be shared between the emulation sessions at each emulator server 126.

For example, when an emulation request is received from the client device 110, the broker server 124 can determine, from the broker database 560 (or alternatively from the database 140 or the session server database), if any emulator server 126 is currently providing an emulation of that computer product. If an emulator server 126 is already providing an emulation of that computer product, the broker server 124 may allocate the received emulation request to that emulator server 126 in order to maximize use of the resources in general.

For example, the broker server 124 may receive an emulation request from the client device 110 requesting an emulation of a computer product, such as the application, Microsoft™ WORD, on a Windows operating system. The broker server 124 may then define session data associated with providing an emulation session of Microsoft Word based on the emulation session identifier. The defined session data may include one or more resource identifiers associated with the corresponding required resources for providing Microsoft WORD on the Windows operation system and an identifier associated with the computer product itself.

The session data may, in some embodiments, include other relevant information for providing the emulation session, such as the emulator server identifiers associated with the one or more emulator servers to provide the emulation session and associated emulation data provided as part of the emulation request. The emulation session may then be initiated by the broker server 124 based on the session data.

To determine whether any emulator server 126 is currently providing an emulation of a particular computer product, the broker server 124 may determine from its records in the broker database 560 (or alternatively from the database 140 or the session server database) if any active emulator server 126 is providing an active emulation session associated with active session data that substantially corresponds to the defined session data. The active session data can substantially correspond to the defined session data if, for example, the active computer product is the same as the requested computer product and a majority, or in some embodiments all, of the one or more active resource identifiers, are the same as the defined resource identifiers.

Continuing with the above example, if the broker server 124 determines that the active session data for the active emulator server 126 substantially corresponds to the defined session data, the broker server 124 may designate the active emulator server 126 as the emulator server 126 for providing the emulation corresponding to the emulation request.

Figure 6B:
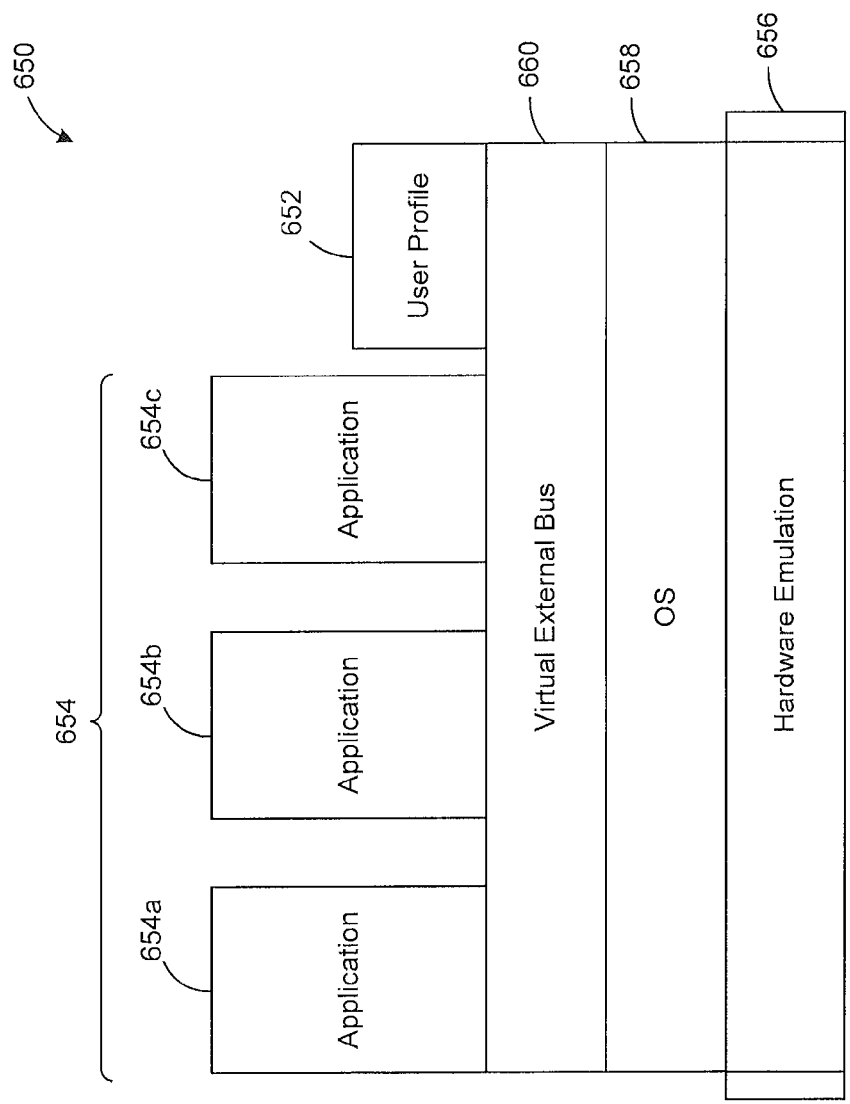
FIG. 6B is an illustration of emulation components within a partitioned memory, in accordance with an example embodiment.

With reference now to both FIGS. 6A and 6B, a process of providing an emulation is described. FIG. 6B illustrates an example emulation within a partitioned memory 650.

For example, as illustrated in FIG. 6B, the partitioned memory 650 includes, at least, a user profile component 652, an application component 654, a hardware emulation component 656, an operating system (OS) component 658, and a virtual external bus component 660. In some embodiments, the application component 654 may include one or more application instances, such as 654a, 654b and 654c.

After partitioning the memory within the storage module 622, the processor module 614 can proceed to identify and initialize the required components within the partitioned memory 650 for providing the emulation.

Based on the received emulation parameters, the processor module 614 can identify a controller module 618 for providing a hardware platform for the emulation. The hardware platform can be initialized as part of the hardware emulation component 656 within the partitioned memory 650. The controller module 618 generally corresponds with the OS on which the emulation is based. It will be understood that each emulator server 126 may provide one or more controller modules 618, and that each controller module 618 is able to emulate a different hardware platform. For example, the hardware platform may include any one of DEC Alpha, AMD 29k, ARC, ARM, Atmel AVR, Blackfin, Intel i860 and i960, MIPS, Motorola 88000, PA-RISC, Power (including PowerPC), SuperH, and SPARC. It will be understood that any suitable hardware platforms may be provided.

After initializing the appropriate controller module 618 within the partitioned memory 650, the processor module 614 can proceed to identify and initialize the required hardware components. These required hardware components can be initialized as part of the hardware emulation component 656 within the partitioned memory 650.

It will be understood that different operating systems can operate only if specific hardware components are available. Accordingly, the required hardware components may, at least, correspond to the operating system as identified from the received emulation parameters. For example, an Android™ system requires for at least a camera to be available. The processor module 614 can determine whether a camera is available on the client device 110. If the processor module 614 determines that a camera is not available on the client device 110, the processor module 614 can initiate the hardware module 630 to provide an emulation of a camera within the partitioned memory 650.

In some embodiments, the emulation parameters may require hardware components that are independent of the operating system requirements for providing the emulation. For example, although the client device 110 may already have a video card, the emulation parameters can require a higher performance video card to be used. The higher performance video card may be available on the emulator server 126 on which the emulation is being provided, or may instead be available on another emulator server 126 accessible over the virtual network bus. The processor module

614 can then initialize the hardware module 630 to provide access to the higher performance video card during the emulation session.

As illustrated in FIG. 6B, after the processor module 614 initializes the hardware emulation component 656, the operating system component 658 can be initialized. The operating system component 658 corresponds to the operating system as indicated in the emulation request. Based on the emulation parameters, the processor module 614 can send a request to the operating system component 658 to provide the corresponding operating system. It will be understood that the operating system emulation module 638 can include images of one or more different operating systems. The operating systems may include Microsoft's Windows™, Apple™ OS, Apple iOS, Android, UNIX™ (e.g., AIX™, Berkeley Software Distribution (BSD), Linux™, etc.). It will be understood that any suitable operating systems may similarly be provided.

In some embodiments, the operating system emulation module 638 may provide the corresponding operating system by providing an image of the operating system to the partitioned memory 650 and initializing the image of the operating system for emulating the operating system.

By providing the hardware emulation component 656 and the operating system component 658 within the partitioned memory, the application component 654 may be provided. The application component 654 corresponds to the applications as indicated within the received emulation parameters. As briefly described above, the application component 654 may include one or more application components, such as application components 654*a*, 654*b*, and 654*c*. It will be understood that fewer or more application components 654 may be provided in the partitioned memory 650.

To provide the application component 654, the processor module 614 initiates the application module 634 to provide the corresponding application to the partitioned memory. In some embodiments, the application module 634 may provide the application to the partitioned memory 650 by providing a copy of the application. In some other embodiments, the application module 634 may provide the application to the partitioned memory 650 by providing a memory address corresponding to where the application is stored in the storage module 622.

It will be understood that the application module 634 may provide various applications to the partitioned memory. For example, the applications may include word processing applications (e.g., Microsoft Word, etc.), data processing applications (e.g., Microsoft Excel, Microsoft Access, etc.), design applications (e.g., Microsoft Visio, AutoCAD, Adobe Photoshop, Adobe Illustrator, etc.), entertainment applications (e.g., Angry Birds, etc.), and other applications.

The emulator server 126 may proceed to provide the emulation pursuant to the emulation request received from the client device 110 after the processor module 614 initializes the corresponding hardware emulation component 656, operating system component 658, and the application component 654 within the partitioned memory 650.

One or more of the described modules for the emulator server 126 may be provided together as a resource module (not shown). The resource module can generally include one or more resource components available at the emulator server 126 without accessing a virtual external bus interface, as will be described with reference to FIG. 7. For example, the resource module may include at least some components of the hardware module 630 and the application module 634.

As briefly described above, different variations of the emulator server 126 may be provided. The central emulator server and the node emulator server are described below with reference to FIGS. 7 and 8. It will be understood that the emulator servers of FIGS. 7 and 8 are merely illustrative examples, and that various different implementations of these emulator servers may be used.

Reference is now made to FIG. 7, which illustrates a block diagram of an example node emulator server 700.

The node emulator server 700 includes, at least, a processor module 714 (e.g., central processing units, or CPU, 0, 1, 2, and 3), a storage module 722 (e.g., a HDD 10.0 TB and a 128 GB RAM), a controller module 718 (e.g., support controllers for microcontrollers that operate on generic architecture and X86/X64), an interface module (e.g., virtual external bus 710), and partitioned memories 750 for providing emulations.

As described above, after receiving the emulator parameters from the broker server 124, the processor module 714 can operate to provide the emulation on the emulator servers 126. The processor module 714 can determine, based on the received emulator parameters, an amount of memory required for providing the emulation and can proceed to partition the required memory within the storage module 722. It will be understood that one or more partitioned memories 750 may be provided on each emulator server 126 for providing emulation sessions. It will be further understood that one partitioned memory 750 may be shared by different emulation sessions.

In some embodiments, the node emulator server 700 may be provided using a known server implementation, such as Windows Server 2008 R2. The Windows Server operates only with generic hardware platform drivers, and therefore, the processor module 714 can enable bypassing of the generic, or standard, hardware platform drivers. The processor module 714 may bypass the generic hardware platform drivers through a bonded Transmission Control Protocol (TCP)/Internet Protocol (IP) connection. The bonded TCP/IP connection is an example process for grouping one or more network cards together. For example, the bonded TCP/IP connection may be provided by virtualizing TCP/IP physical resources and emulating those resources. By virtualizing the TCP/IP physical resources, the processor module 714 may then bypass the generic drivers or bond those drivers together.

With the use of the bonded TCP/IP connection, the processor module 714 can provide the controller module 718 corresponding to the operating system indicated in the emulation parameters within the partitioned memory 750.

The virtual external bus 710 can generally operate as the interface module for at least the node emulator server 700, and may extend to the emulator system 120.

In some embodiments, the virtual external bus 710 may operate across local networks and/or virtual private networks (VPN). The virtual external bus 710 can operate to facilitate communication between different device components. The device components may include one device component that is associated with a first data bus type and another device component that is associated with a second data bus type, and the second data bus type differs from the first data bus type.

In some embodiments, the virtual external bus 710 may be provided across any network for sending or providing resources at a suitable speed and acceptable latency.

The virtual external bus 710 may be provided as PCI or a virtual PCI bus that operates at the operating system level. Since the virtual external bus 710 can be a PCI bus, any hardware component may be accessed without customizing the node emulator server 700. With the virtual external bus 710, the node emulator server 700 may transmit data to and/or receive data from other components within the emulator system 120.

In another example, the processor module 714 may determine that a resource that is required for providing the emulation is unavailable at the node emulator server 700. The processor module 714 can then access the unavailable resource at another emulator server that is separate from the node emulator server 700 but in electronic communication with the node emulator server 700 via the virtual external bus 710. The another emulator server can be referred to as a remote emulator server.

In some embodiments the unavailable resource may be an operation system component, which is a resource that is required for initializing the operating system. When the processor module 714 determines that the operation system component is unavailable, the processor module 714 can access that unavailable resource from the remote emulator server.

The processor module 714 may access the unavailable resource by providing a platform driver for the unavailable operating system component. After providing the platform driver, the processor module 714 can locate, from the database or the storage module 722, the remote emulator server with the unavailable operating system component. Once the remote emulator server is located, the processor module 714 can initialize the unavailable operating system component at the remote emulator server. Operational data can then be provided between the unavailable operating system component and the node emulator server 700 via the virtual external bus 710.

In some embodiments the unavailable resource may be a product component, which is a resource required for initializing the computer product. When the processor module 714 determines that the product component is unavailable, the processor module 714 can access that unavailable resource from the remote emulator server.

The processor module 714 may access the unavailable resource by locating, from the database or the storage module 722, the remote emulator server with the unavailable product component. Similar to providing an unavailable operating system component, once the remote emulator server is located, the processor module 714 can initialize the unavailable product component at the remote emulator server. Operational data can then be provided between the unavailable product component and the node emulator server 700 via the virtual external bus 710.

For example, the unavailable product component may be a hardware component. Therefore, as noted, the node emulator server 700 may access the unavailable hardware component, via the virtual external bus 710, at another emulator server, such as the central emulator server 800.

In some embodiments, the virtual external bus 710 may operate to provide a VPN connection.

Reference is now made to FIG. 8, which illustrates a block diagram of an example central emulator server 800. Similar to the node emulator server 700, the central emulator server 800 also includes a processor module 814 (e.g., CPU, 0, 1, 2, and 3), a storage module 822 (e.g., a HDD 10.0 TB and a 128 GB RAM), a controller module 818 (e.g., support controllers for microcontrollers that operate on RISC, ARM, ARM-iPAD version, generic architecture and X86/X64), an interface module (e.g., virtual external bus 810a and external PCI bus 810b), and partitioned memories 850 for providing emulations.

Unlike the node emulator server 700, the central emulator server 800 can provide hardware components 832 that typically cannot be used over a network to be used over the network (these hardware components may be referred to as non-network hardware components). The central emulator server 800 can also provide access to external hardware components 834.

The central emulator server 800 can enable use of the non-network hardware components 832 through the use of an external PCI bus 810b, The external PCI bus 810b may communicate with the virtual external bus 810a so that the non-network hardware components 832 may also be accessed by node emulator servers 700. As illustrated in FIG. 8, the non-network hardware component 832 is an NVidia Tesla video card. However, it will be understood that other non-network hardware components 832 such as sound cards, video cards, midi card, video converters (e.g., NTCS to PAL), and emulator cards may similarly be provided via the external PCI bus 810b.

As illustrated in FIG. 8, the external hardware components 834 may also be provided via the external PCI bus 810b. Example external hardware components 834 include a GSM simulator 834a and an automotive simulator 834b. It will be understood that other external hardware components 834 may similarly be provided.

The present invention has been described here by way of example only. Various modification and variations may be made to these exemplary embodiments without departing from the spirit and scope of the invention.

We claim:

1. A method for managing an emulation of a computer product, the method comprising:
   receiving emulation parameters associated with the emulation of the computer product, the emulation parameters defining one or more resources required to provide the emulation;
   identifying at least two capable emulator servers from a plurality of emulator servers based at least on the one or more resources, the at least two capable emulator servers being operable to provide the at least one or more resources;
   retrieving, from at least one database, emulator server data for each capable emulator server, the emulator server data comprising operational characteristics associated with that capable emulator server;
   determining, from the at least one database, one or more criteria usable for selecting an emulator server from the at least two capable emulator servers to provide the emulation; and
   selecting the emulator server from the at least two capable emulator servers to provide the emulation, the emulator server being a capable emulator server from the at least two capable emulator servers associated with emulator server data satisfying at least some of the one or more criteria, wherein the selection comprises:
      determining a plurality of criterion counts, by, for each capable emulator server in the at least two capable emulator servers, determining a criterion count associated with that capable emulator server, the criterion count being based, at least in part, on a number of the criteria satisfied by that capable emulator server; and
      based on the plurality of criterion counts, selecting the emulator server from the at least two capable emulator servers;
   wherein the number of criteria satisfied by that capable emulator server at least partly depends on at least one resource, in the one or more resources, providable via the capable emulator server.

2. The method of claim 1, wherein:
at least one capable emulator server in the at least two capable emulator servers is operable to provide at least one resource in the at least one or more resources by engaging one or more other emulator servers having the at least one resource.

3. The method of claim 2, wherein:
the one or more criteria comprises a server threshold, the server threshold indicating a maximum number of servers allowable for jointly providing the emulation;
the operational characteristics comprising a server count for each emulator server, the server count indicating a number of other emulator servers required by that emulator server to provide the emulation; and
selecting the emulator server from the at least two capable emulator servers to provide the emulation comprises, for each capable emulator server:
comparing the server count with the server threshold; and
indicating the server threshold is satisfied if the server count is less than the server threshold, otherwise, indicating the server threshold is not satisfied.

4. The method of claim 1, further comprising, for each capable emulator server:
storing the criterion count for that capable emulator server in the at least one database;
determining whether each criterion in the one or more criteria is satisfied based on the emulator server data associated with that capable emulator server; and
for each satisfied criterion, incrementing the criterion count by one.

5. The method of claim 1, wherein:
the one or more criteria comprises a work load threshold, the work load threshold indicating a maximum usage of the emulator server for providing emulations;
the operational characteristics comprising a current work load amount for each capable emulator server, the current work load amount indicating an existing usage of that capable emulator server; and
selecting the emulator server from the at least two capable emulator servers to provide the emulation comprises, for each capable emulator server:
comparing the current work load amount with the work load threshold; and
indicating the work load threshold is satisfied if the current work load amount is less than the work load threshold, otherwise, indicating the work load threshold is not satisfied.

6. The method of claim 5, wherein each of the maximum usage and the existing usage is defined by at least one of a number of active emulation sessions being provided by a corresponding emulator server and an amount of memory used by the active emulation sessions.

7. The method of claim 1, wherein:
the one or more criteria comprises a geographic restriction, the geographic restriction defining a geographic boundary for the emulator server;
the operational characteristics comprising a location of each emulator server; and
selecting the emulator server from the at least two capable emulator servers to provide the emulation comprises, for each capable emulator server:
comparing the geographic restriction with the location; and
indicating the geographic restriction is satisfied if the location is within the geographic boundary, otherwise, indicating the geographic restriction is not satisfied.

8. The method of claim 7, wherein:
the emulation parameters are provided from a client device at a device location, the client device having a processor and a memory; and
the geographic boundary comprises a proximity range with respect to the device location.

9. The method of claim 1, wherein:
the one or more criteria comprises a state condition, the state condition indicating a status required at the emulator server for providing emulations;
the operational characteristics comprising an emulator state for each emulator server, the emulator state indicating an ability of that emulator server to provide any emulation; and
selecting the emulator server from the at least two capable emulator servers to provide the emulation comprises, for each capable emulator server:
comparing the emulator state with the state condition; and
indicating the state condition is satisfied if the emulator state corresponds to the state condition, otherwise, indicating the state condition is not satisfied.

10. The method of claim 9, wherein the state condition is an available state and the emulator state is selected from the group consisting of the available state, an error state and an unavailable state.

11. The method of claim 1, wherein:
the one or more criteria comprises a component threshold, the component threshold indicating a maximum number of components usable for providing the at least one or more resources for the emulation;
the operational characteristics comprising a component count for each emulator server, the component count indicating a number of components required by that emulator server to provide the emulation; and
selecting the emulator server from the at least two capable emulator servers to provide the emulation comprises, for each capable emulator server:
comparing the component count with the component threshold; and
indicating the component threshold is satisfied if the component count is less than the component threshold, otherwise, indicating the component threshold is not satisfied.

12. The method of claim 1, wherein selecting the emulator server from the at least two capable emulator servers to provide the emulation comprises initiating the emulator server to provide the emulation of the computer product.

13. The method of claim 12, wherein initiating the emulator server to provide the emulation of the computer product comprises providing at least the emulation parameters to the emulator server.

14. The method of claim 12, wherein initiating the emulator server to provide the emulation of the computer product comprises:
initiating a cache emulator server to concurrently provide the emulation of the computer product with the emulator server.

15. The method of claim 14, further comprising:
receiving, from the emulator server, an error message indicating the emulator server is experiencing an operational problem; and in response to receiving the error message, switching to the emulation provided by the cache emulator server.

16. The method of claim 1, wherein the one or more resources comprises at least one of (i) a hardware component controllable by a server processor and (ii) a software component storable on a storage module in electronic communication with the emulator server.

17. The method of claim 1, wherein the one or more criteria is determined based on at least one of the emulator server data and the emulation parameters.

18. A system for managing an emulation of a computer product, the system comprising a processor configured to:
   receive emulation parameters associated with the emulation of the computer product, the emulation parameters defining at least one or more resources required to provide the emulation;
   identify at least two capable emulator servers from a plurality of emulator servers based at least on the one or more resources, the at least two capable emulator servers being operable to provide the at least one or more resources;
   retrieve, from at least one database in electronic communication with the processor, emulator server data for each capable emulator server, the emulator server data comprising operational characteristics associated with that capable emulator server;
   determine, from the at least one database, one or more criteria usable for selecting an emulator server from the at least two capable emulator servers to provide the emulation; and
   select the emulator server from the at least two capable emulator servers to provide the emulation, the emulator server being a capable emulator server from the at least two capable emulators associated with emulator server data satisfying at least some of the one or more criteria, wherein the selection comprises:
      determining a plurality of criterion counts, by, for each capable emulator server in the at least two capable emulator servers, determining a criterion count associated with that capable emulator server, the criterion count being based, at least in part, on a number of the criteria satisfied by that capable emulator server; and
      based on the plurality of criterion counts, selecting the emulator server from the at least two capable emulator servers;
   wherein the number of criteria satisfied by that capable emulator server at least partly depends on at least one resource, in the one or more resources, providable via the capable emulator server.

* * * * *